United States Patent [19]
Firey

[11] Patent Number: 5,257,497
[45] Date of Patent: * Nov. 2, 1993

[54] PRODUCER GAS RESERVOIRS FOR CYCLIC CHAR FUEL OXIDATION REACTORS

[76] Inventor: Joseph C. Firey, P.O. Box 15514, Seattle, Wash. 98115-0514

[*] Notice: The portion of the term of this patent subsequent to Jan. 12, 2011 has been disclaimed.

[21] Appl. No.: 895,739

[22] Filed: Jun. 9, 1992

[51] Int. Cl.$^5$ .................. F02B 43/00; F02G 3/00
[52] U.S. Cl. .................. 60/39.12; 48/DIG. 6
[58] Field of Search .................. 60/39.02, 39.12; 110/297, 300, 302, 308; 48/197 R, DIG. 6

[56] References Cited

U.S. PATENT DOCUMENTS

| | | | |
|---|---|---|---|
| 4,085,578 | 4/1978 | Kydd | 60/39.12 |
| 4,509,957 | 4/1985 | Firey | 60/39.12 |
| 4,533,362 | 8/1985 | Firey | 48/DIG. 6 |
| 4,568,361 | 2/1986 | Firey | 48/197 R |
| 5,177,953 | 1/1993 | Firey | 60/39.12 |

Primary Examiner—Richard A. Bertsch
Assistant Examiner—Howard R. Richman

[57] ABSTRACT

Reacted gas reservoirs are added to each primary reactor of a cyclic char fuel oxidation reactor within which product gas, created by reaction in the primary reactor, is stored during compression. The extent of primary reaction per cycle can be increased by use of these product reacted gas reservoirs.

8 Claims, 8 Drawing Sheets

PRODUCER GAS RESERVOIRS FOR CYCLIC CHAR FUEL OXIDATION REACTORS

CROSS REFERENCES TO RELATED APPLICATIONS

This invention is related to my following U.S. patent applications:
1. *Cross Flow Primary Reactors for Cyclic Char Burning Engines and Gasifiers*, Ser. No. 07/725823, now issued as U.S. Pat. No. 5,109,808, as of May 5, 1992.
2. *Cyclic Char Fuel Oxidation Reactors with Cross Flow Primary Reactors*, Ser. No. 07/731,208, filed Jul. 15, 1991now issued as U.S. Pat. No. 5,177,953 as of Jan. 12, 1993.
3. *Opposed Cross Flow Primary Reactors for Cyclic Char Burning Engines and Gasifiers*, Ser. No. 07/823,479, filed Jan. 21, 1992 will issue as U.S. Pat. No. 5,201,283 on Apr. 13, 1993.
4. *Cyclic Char Fuel Oxidation Reactors with Opposed Cross Flow Primary Reactor*, Ser. No. 07/848,545, filed Mar. 9, 1992 now issued as U.S. Pat. No. 5,193,338 as of Mar. 16, 1993.
5. *Product Gas Reservoirs for Cyclic Char Burning Engines and Gasifiers*, received in U.S. Patent Office but filing receipt not received now Ser. No. 07/876,303.

BACKGROUND OF THE INVENTION

1. Field of the Invention

This invention is in the field of cyclic char fuel oxidation reactor plants wherein several char fuel masses within several separate primary reactors are first compressed with reactant air from a separate compressor followed by expansion of resulting reacted gas into a separate exander and this cycle of compression followed by expansion is repeated.

2. Description of the Prior Art

The following U.S. patents describe several example types of cyclic char fuel oxidation reactor plants with which the improvements of this invention can be used:
U.S. Pat. No. 4,455,837; J. C. Firey, Jun. 26, 1984
U.S. Pat. No. 4,484,531; J. C. Firey, Nov. 27, 1984
U.S. Pat. No. 4,509,957; J. C. Firey, Apr. 9, 1985
U.S. Pat. No. 4,568,361; J. C. Firey, Feb. 4, 1986
U.S. Pat. No. 4,707,991; J. C. Firey, Nov. 24, 1987

In all of these example cyclic char fuel oxidation reactor plants, the gaseous reactants, such as air, are compressed into the pore spaces of the char fuel contained within several primary reactors inside pressure vessel containers. Primary reaction of the gaseous reactants with the char fuel occurs within the pore spaces during compression. Expansion of these primary product gases then occurs out of the pore spaces of the char fuel. In some forms of a cyclic char fuel oxidation reactor plant the primary product gases are further reacted with additional reactant gases in a secondary reaction within a secondary reaction chamber during expansion. This cycle of gas compression followed by expansion is repeated for each of the pressure vessel containers, with fresh gaseous reactants being supplied for each compression and with final product reacted gases being removes during each expansion. The descriptions of cyclic char fuel oxidation reactor plants contained in the above listed U.S. Patents are incorporated herein by reference thereto. The compressors of these plants are separate from the expanders thereof, but may be driven thereby, as for example where a centrifugal compressor is driven via its input shaft by the output shaft of a gas turbine engine expander.

Several char fuel containers are used on these cyclic char fuel oxidation reactor plants and these are pressure vessel containers whose number at least equals the sum of the number of compressor stages plus the number of expander stages. Each of these containers is fitted with a refuel means for adding char fuel into the refuel end of the primary reactor and an ash removal means for removing ashes or spent char fuel material from the ash removal end of the primary reactor.

The compressor means of these cyclic char fuel reaction plants comprise one or more stages, as defined in the material incorporated by reference, and each such stage has a delivery end outlet at its high pressure end through which the compressed gas may flow out of a stage and into a connected char fuel container. The expander means of these cyclic char fuel reaction plants may be a work producing engine and comprise one or more stages, as defined in the material incorporated by reference, and each such stage has an inlet at its high pressure end through which the reacted gas may flow into the expander stage from the connected char fuel container. The expander can be a simple blow down expander of low cost. But in many cyclic char fuel oxidation reactor plants we will prefer to use an expander engine, such as a gas turbine in order to recover the available work of expansion. This expander engine work can be used to drive the compressor and to generate output work via a means for absorbing expander work such as an electric generator.

Each container has separate changeable gas flow connections to each delivery end outlet of each compressor stage and to each inlet of each expander stage and these changeable gas flow connections comprise means for opening and closing these connections while the plant is operating. These several means for opening and closing are controlled by a means for controlling the opening and closing of the changeable gas flow connections so that:

1. Each container is opened for a time period to each outlet of each stage of the compressor, in a sub sequence of time periods of open gas flow connections to compressor stage outlets, proceeding in time order of increasing compressor stage delivery pressure.

2. Each container is opened for a time period to each inlet of each stage of the expander, in a sub sequence of time periods of open gas flow connections to expander stage inlets, proceeding in time order of decreasing expander stage inlet pressure.

3. A sub sequence of gas flow connections to expander stage inlets follows after each sub sequence of gas flow connections to compressor stage outlets, and these sub sequences are repeated.

4. During any one time period of these sub sequences of connections each container is open gas flow connected to but one stage of either the compressor or the expander.

5. During any one time period of these sub sequences of connections each stage is open gas flow connected to but one container.

Additional detailed descriptions of char fuel containers and changeable gas flow connections are presented in the material incorporated by reference, for example in U.S. Pat. No. 4,509,957, col. 14, line 46 through line 58, and col. 18, line 39 through line 52.

As used herein and in the claims the term char fuel is as defined in U.S. Pat. No. 4,509,957, col. 2, line 58 through 68, and in U.S. Pat. No. 4,455,837, col. 4, line 8 through line 16, and this material is incorporated herein by reference.

As used herein and in the claims the terms oxygen gas, and a gas containing appreciable oxygen gas, are as defined in U.S. Pat. No. 4,509,957, col. 3, line 1 through line 8 and in U.S. Pat. No. 4,455,837, col. 4, line 1 through line 7, and this material is incorporated herein by reference.

A means for preheating the char fuel within the primary reaction chamber is used to bring the char fuel up to that temperature at which it will react rapidly with oxygen in adjacent compressed gases while the plant is being started. Thereafter the means for preheating the char fuel can be turned off when the heat of the primary reaction becomes sufficient to keep the char fuel at or above this rapid reaction temperature. During starting a cranking means is used to drive the compressor.

As char fuel is reacted to ashes within the primary reactor it is replaced by a refuel mechanism means for supplying fresh char fuel into a refuel end of the primary reactor. The char fuel is thus moved along through the primary reactor toward an opposite ash collection end of the primary reactor. Hence the char fuel being reacted within the primary reactor has a direction of motion from the refuel end toward the ash collection end. An ash removal mechanism is used as a means for removing ashes from the primary reaction chamber.

Where air is the reactant gas it is readily available from the atmosphere. In some applications oxygen enriched air or essentially pure oxygen may be used as the reactant gas, as for example in some gasifier uses, and here a source of oxygen rich gas is needed.

The term producer gas is used herein and in the claims to mean those reacted gases emerging from the primary reactor during expansion and this is normally a fuel gas containing carbon monoxide and other components.

The term secondary reacted gas is used herein and in the claims to mean those reacted gases within the secondary reactor, and for engines these are normally essentially complete combustion products containing carbon dioxide and other components.

For cyclic char fuel oxidation gasifiers the secondary reacted gas is normally also a producer gas since a secondary reaction is not used when char fuel gasification is the purpose.

The term fixed open gas flow connection is used herein and in the claims to mean a gas flow passage which remains open whenever the cyclic char fuel oxidation reactor is operating.

The term changeable gas flow connection is used herein and in the claims to mean a gas flow passage which can be opened or closed while the cyclic char fuel oxidation reactor plant is operating. A changeable gas flow connection is opened and closed by a means for opening and closing.

As the char fuel within the primary reactor moves along the char fuel motion direction, it is preheated by heat transfer from char fuel portions which are further along and are reacting rapidly with oxygen and thus are at a high temperature. Where the char fuel being used is essentially free of volatile matter, as with coke fuel, this preheat zone serves to bring the new char fuel up to its rapid reaction temperature. The char fuel then enters the rapid reaction zone and carbon reacts therein with oxygen to form producer gas. Beyond the rapid reaction zone in the direction of char fuel motion the char fuel is essentially completely reacted to ashes which pass into an ash collection zone at the end of the char fuel motion path.

In prior art cyclic char fuel oxidation reactors the ashes are removed from the ash collection zone of the primary reactor at the end of the char fuel motion path by an ash removal mechanism. Most such ash removal mechanisms remove a volume of material at intervals and it is necessary to control either the volume, or the interval, or both, so that only ashes, and no unburned char fuel, are removed. While such control means are feasible they are necessarily complex since it is difficult to sense the ash quantity and ash level existing within the ash collection zone. It would be desirable to have available an ash removal means which did not require such sensing of ash level within the primary reactor.

Within the space occupied by the chunks of char fuel two types of pore spaces exist. Within each char fuel chunk interior pore spaces exist in most char fuels. Between the char fuel chunks interstitial pore spaces exist.

In these prior art cyclic char fuel oxidation reactors the air quantity available for the primary reaction with char fuel is restricted to the air compressed into the interior and interstitial pore spaces of the hot char fuel in the rapid reaction zone during compression. It would be desirable to be able to increase the extent of char fuel reaction during each cycle by increase of the reactant air quantity available to the primary reaction.

SUMMARY OF THE INVENTION

Reservoirs are provided on each primary reactor of a cyclic char fuel oxidation reactor which connect into the primary reaction chamber containing char fuel. During compression air flows from the connected compressor stage outlet into the primary reaction chamber and reacts therein to form primary reacted gas, a producer gas. The producer gas thusly formed flows on into the reservoir and is stored there during compression.

In one form of this invention the reservoir connects only to the primary reaction chamber. During expansion following compression primary reacted gas flows out of the reservoir and through the primary reaction chamber and into the connected expander stage for this first form of this invention. Thus the gas flow direction through the primary reactor during expansion is opposite to the gas flow direction during compression.

In another preferred form of this invention changeable gas flow connections are added which connect the several stages of the compressor to the primary reaction chamber during compression and connect the several stages of the expander to the reservoir during expansion. For this preferred form of this invention gas flows out of the reservoir and into the connected expander stage during expansion. Gas also flows during expansion from the primary reaction chamber into the reservoir and then into the connected expander stage for this preferred form of this invention.

For those forms of this invention using changeable gas flow connections, as described above, the gas flow direction through the primary reactor is the same during both compression and expansion. This flow direction is from the connection of the primary reactor to the compressor stage toward the connection of the primary reactor to the reservoir.

When the char fuel used contains volatile matter it will sometimes be preferred that gas flow through the primary reactor be from the refuel end toward the ash removal end. This gas flow direction can be secured in those forms of this invention using changeable gas flow connections by placing the connection from the connected compressor stage into the refuel end of the primary reactor and placing the connection to the reservoir into the ash removal end of the primary reactor. With this refuel to ash removal gas flow direction, tar formation is reduced since the volatile matter distilling out of freshly refueled coal from which tar is created is first mixed with air from the compressor before passing into the high temperature of the rapid reaction zone in the primary reaction chamber, and this is one of the beneficial objects of this invention.

When the char fuel is of low volatile matter as with coke it will sometimes be preferred that gas flow through the primary reactor be from the ash collection end toward the refuel end. This gas flow direction can be secured in those forms of this invention using changeable gas flow connections by placing the connection from the connected compressor stage into the ash removal end of the primary reactor and placing the connection to the reservoir into the refuel end of the primary reactor. With this ash removal to refuel gas flow direction ash particles are filtered out of the flowing gas by the larger char fuel particles and ash carryover is reduced, and this is another and different beneficial object of this invention.

With the reacted gas reservoirs of this invention a greater quantity of air passes through the rapid reaction zone of the primary reactor during compression than can be compressed into only the pore and interstitial volumes of the hot char fuel mass within the primary reactor. Substantially all of the oxygen gas within those air quantities which pass through the rapid reaction zone or are compressed into the pore and interstitial volumes within the rapid reaction zone will react with the carbon therein to form primary reacted gas much of which then flows on into the reservoir. By thusly increasing the air quantity which reacts with hot carbon, the use of the reservoirs of this invention increase the extent of the primary reaction during each cycle of compression and expansion. In this way power output of the plant can be increased. The volume of the reacted gas reservoir can be made adjustable and in this way, so can the extent of primary reaction, and the power can be adjusted while running. This increase of available power and extent of reaction and adjustment thereof are among the beneficial objects of this invention.

The primary reacted gas reservoirs of this invention can also be arranged so that a mechanical separation of tar and ash particles from gas takes place in the reservoir. The thusly separated and collected tar and ash can then be periodically removed from the reservoir with an ash removal mechanism. When the tar and ash mixture is of reasonably low viscosity, as for example when kept at a moderately high temperature, the ash removal mechanism can be a simple valve. This mechanically simple ash removal mechanism is another beneficial object of this invention.

BRIEF DESCRIPTION OF THE DRAWINGS

A schematic diagram of an example cyclic char fuel oxidation reactor is shown in FIG. 1 and FIG. 6.

One form of primary reactor of this invention is shown in FIG. 2.

Figure 3:
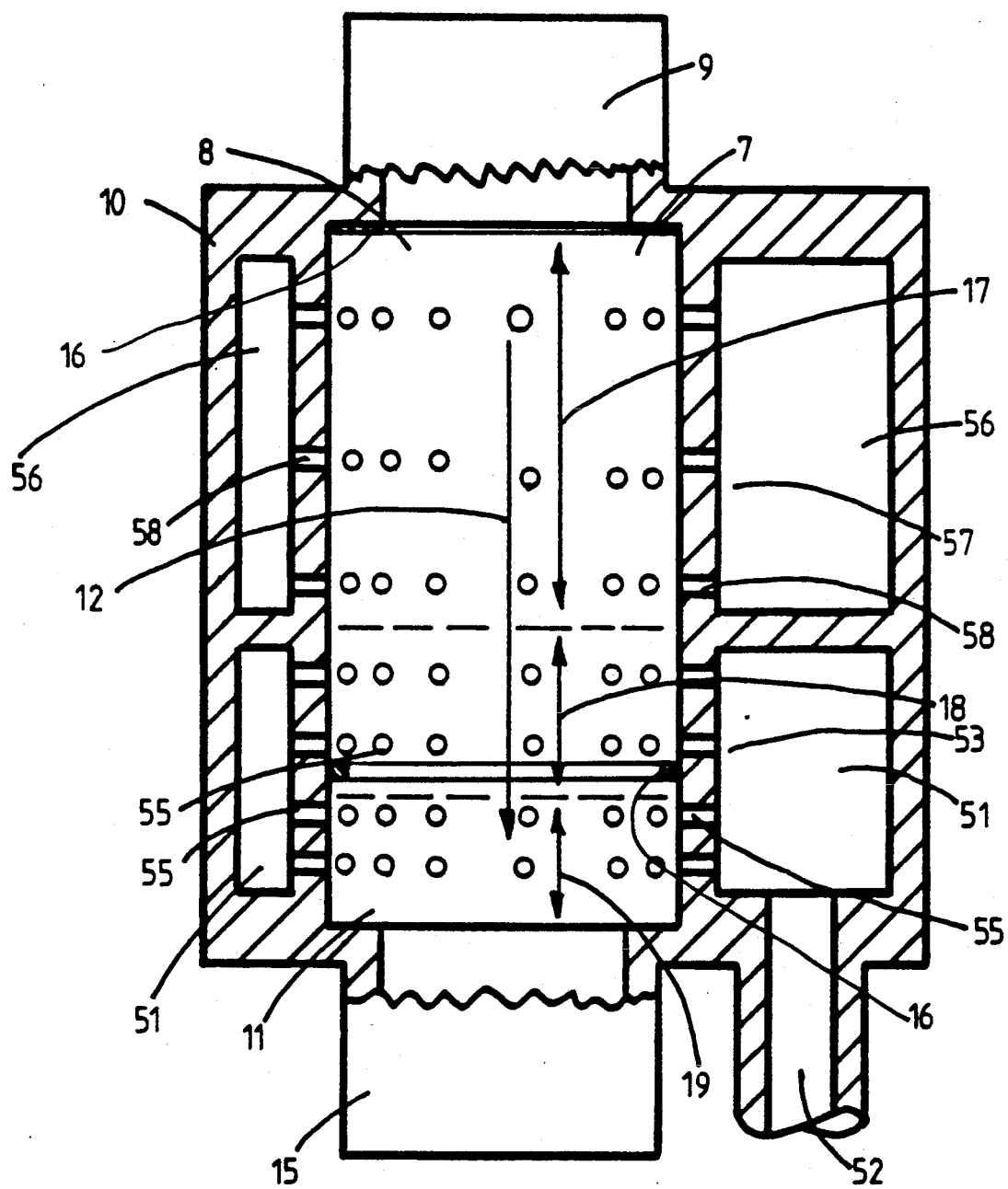

Another form of primary reactor of this invention is shown in FIG. 3.

Figure 4:
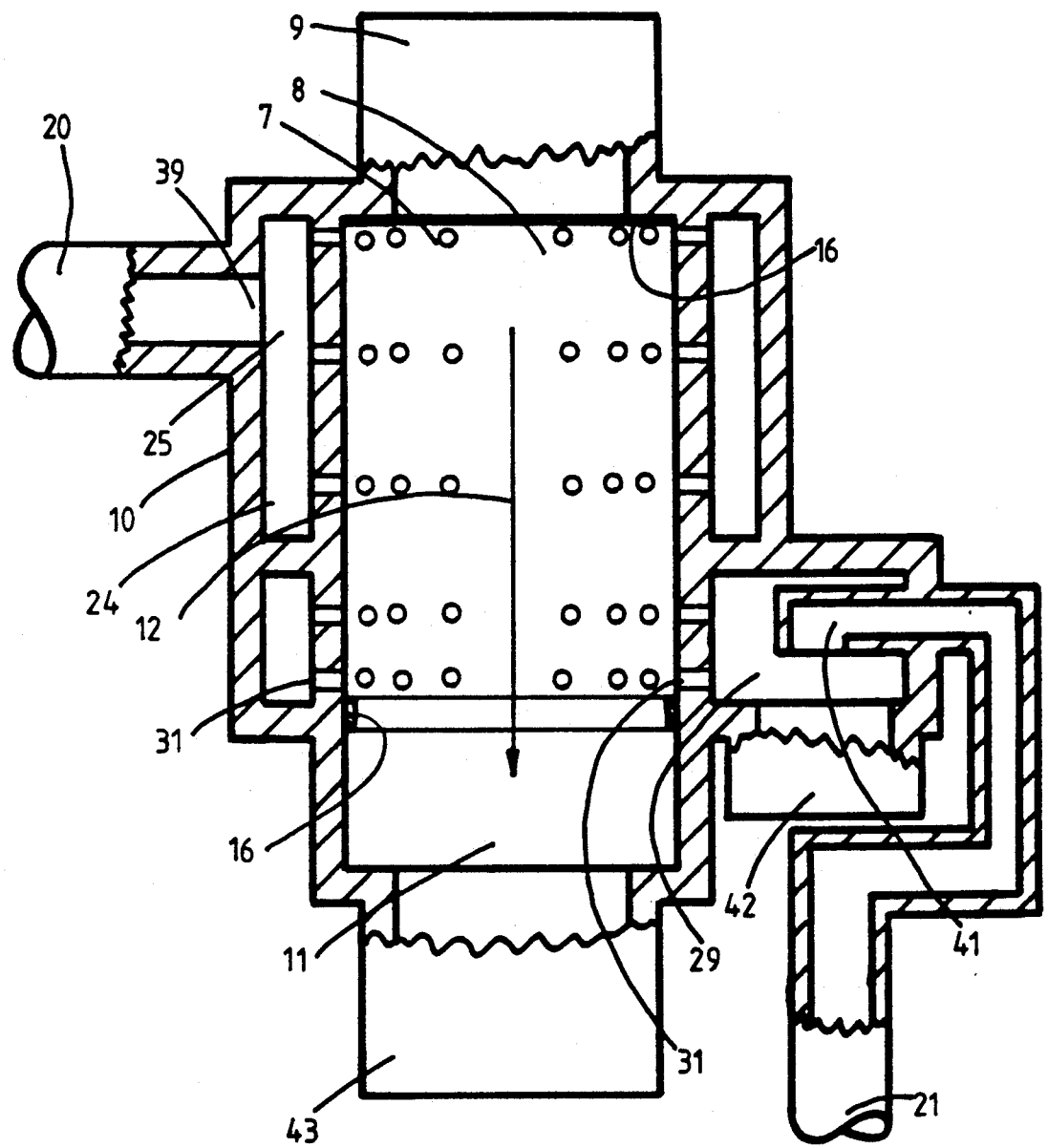

A unidirectional gas flow form of primary reactor is shown in FIG. 4.

Figure 5:
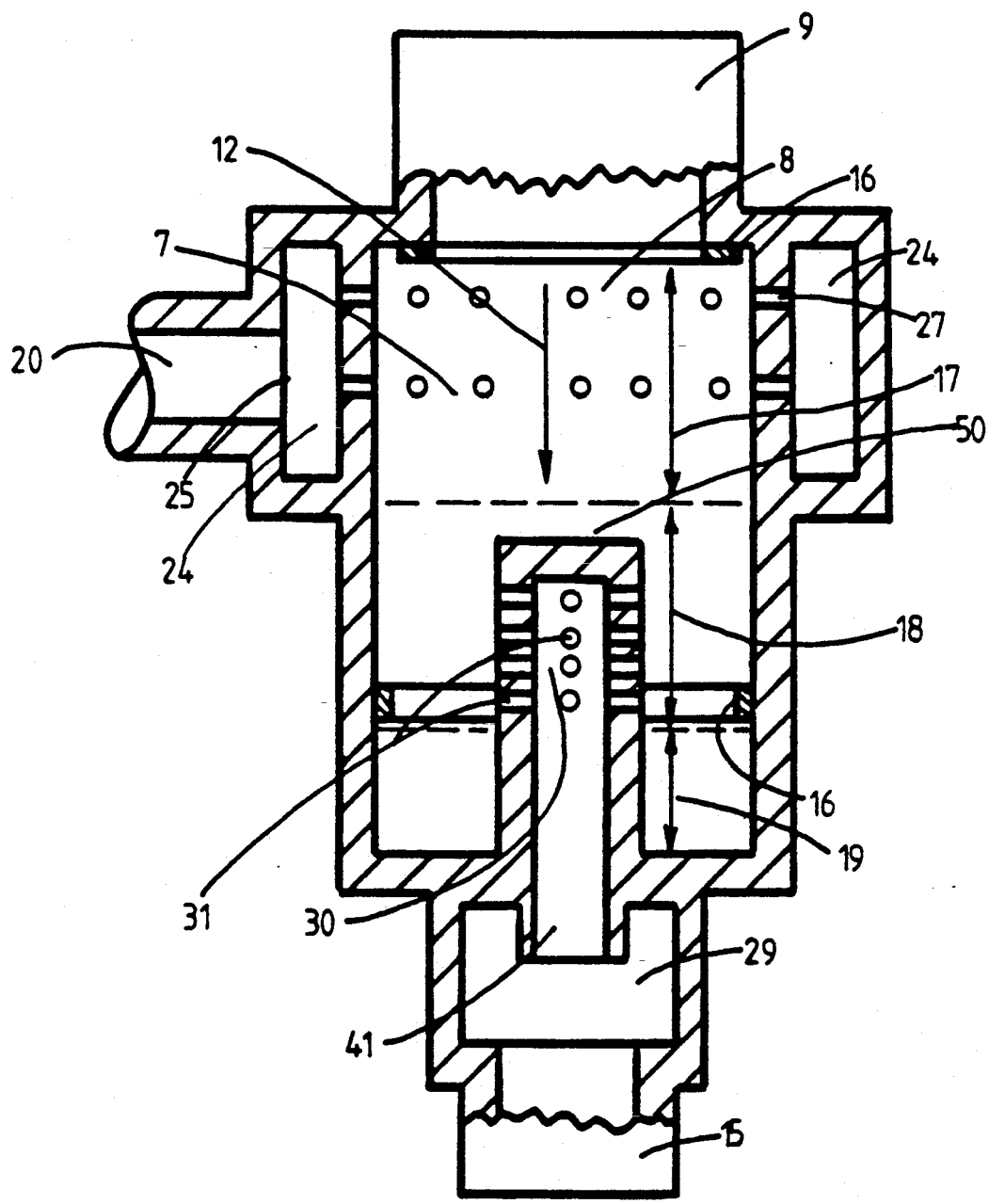

Another form of primary reactor of this invention is shown in FIG. 5.

Figure 7:
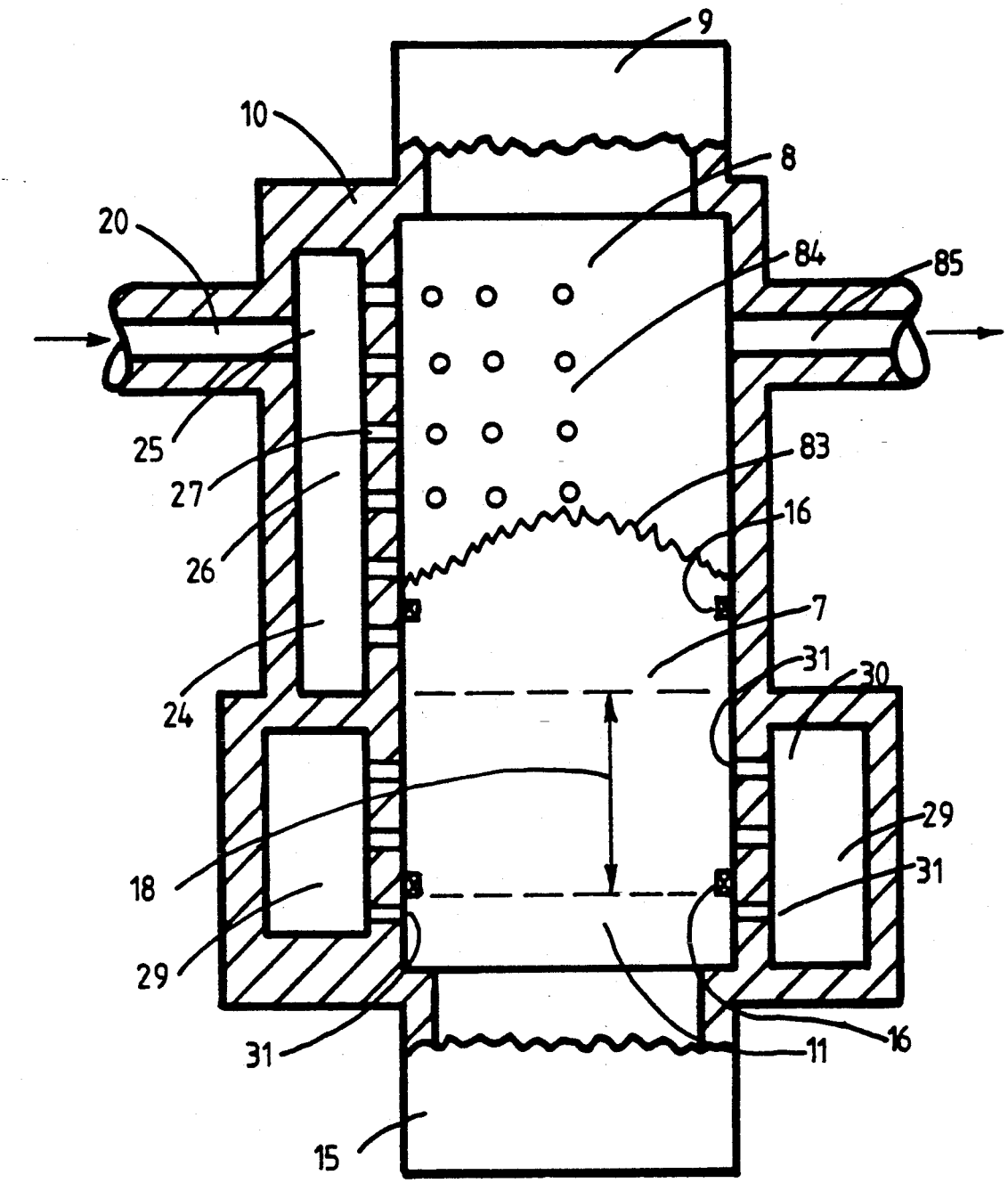

An example of a combined primary and secondary reactor is shown in FIG. 7.

Figure 8:
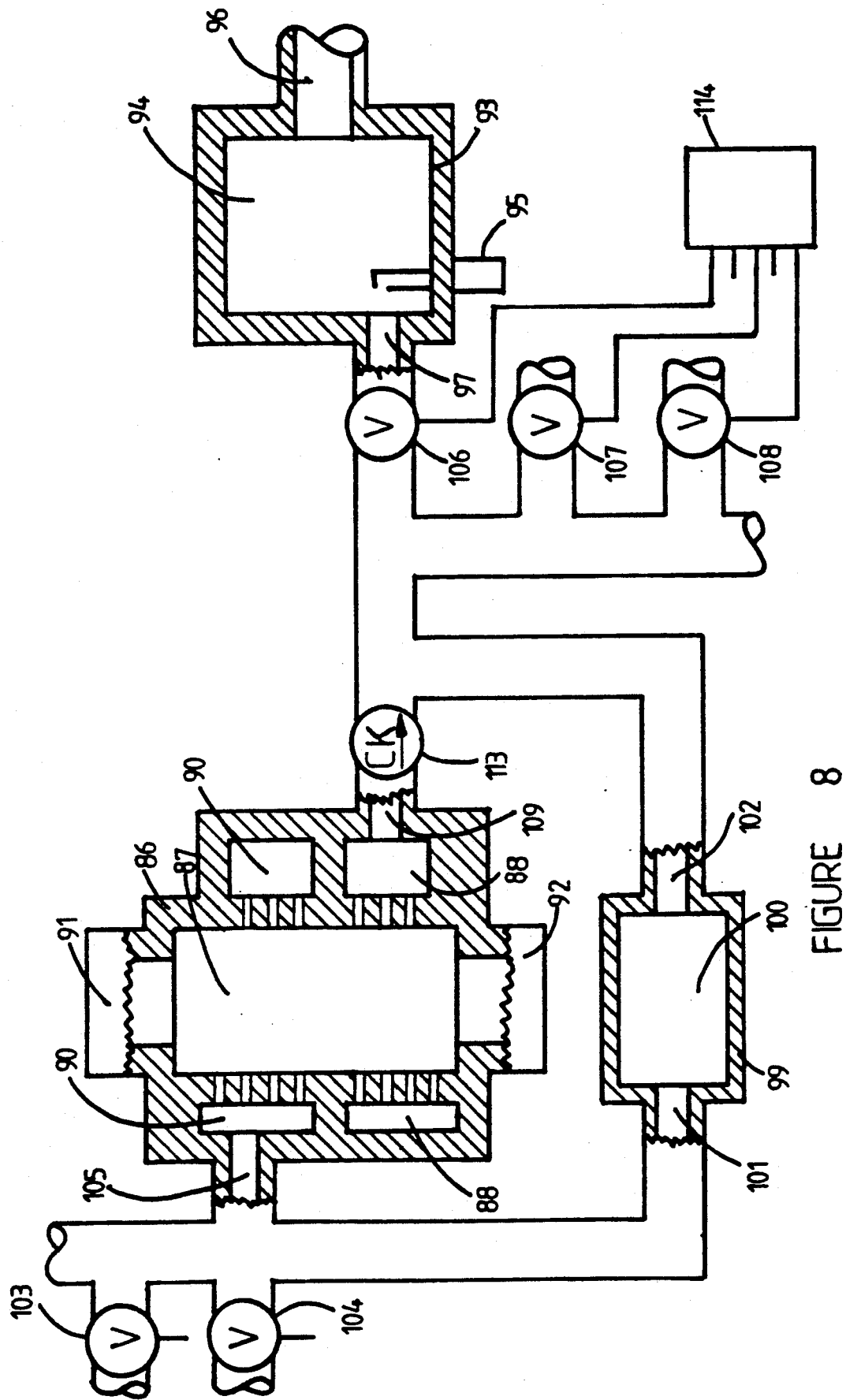

An example of a separated secondary reactor is shown in FIG. 8.

DESCRIPTION OF THE PREFERRED EMBODIMENTS

Figure 1:
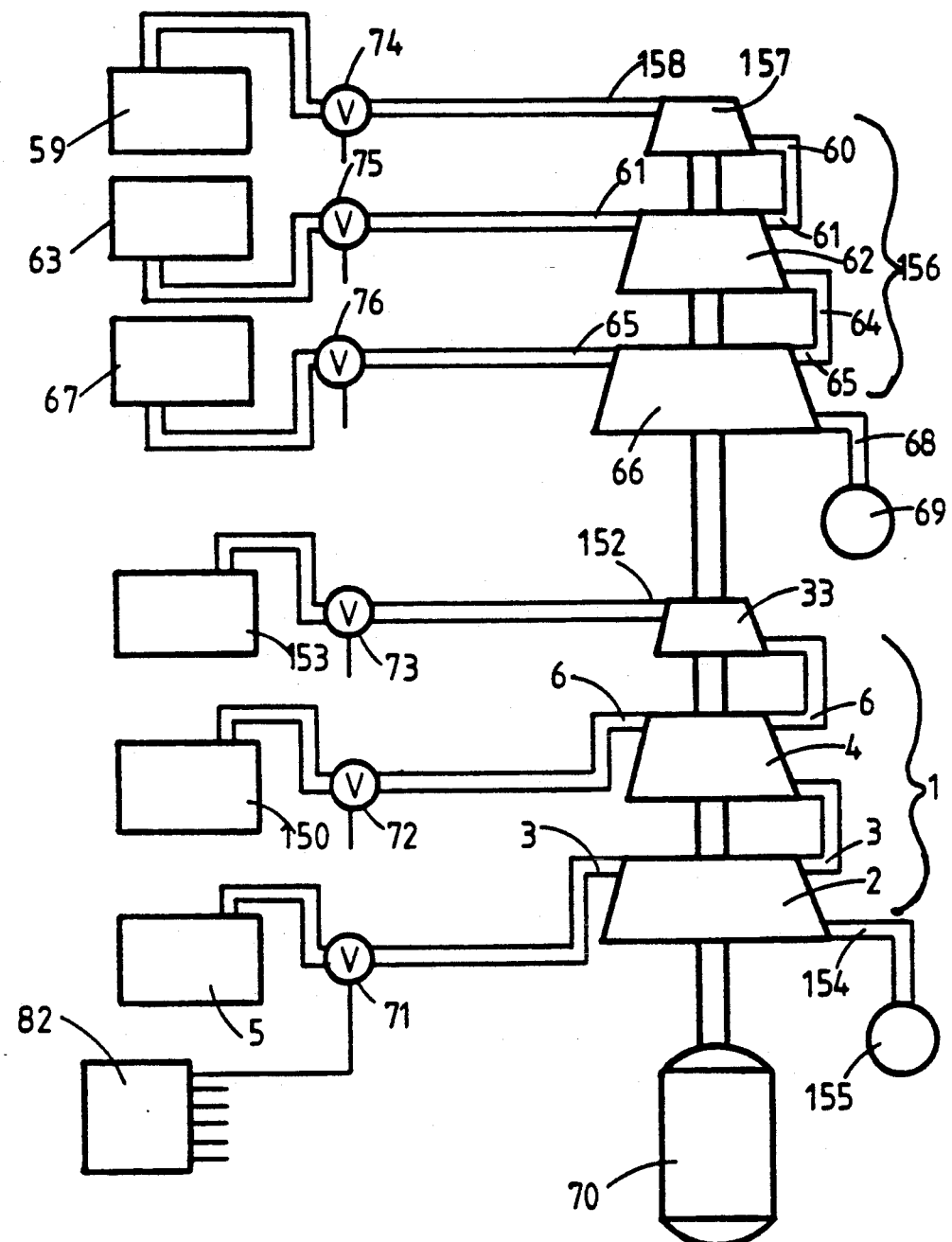
Figure 6:
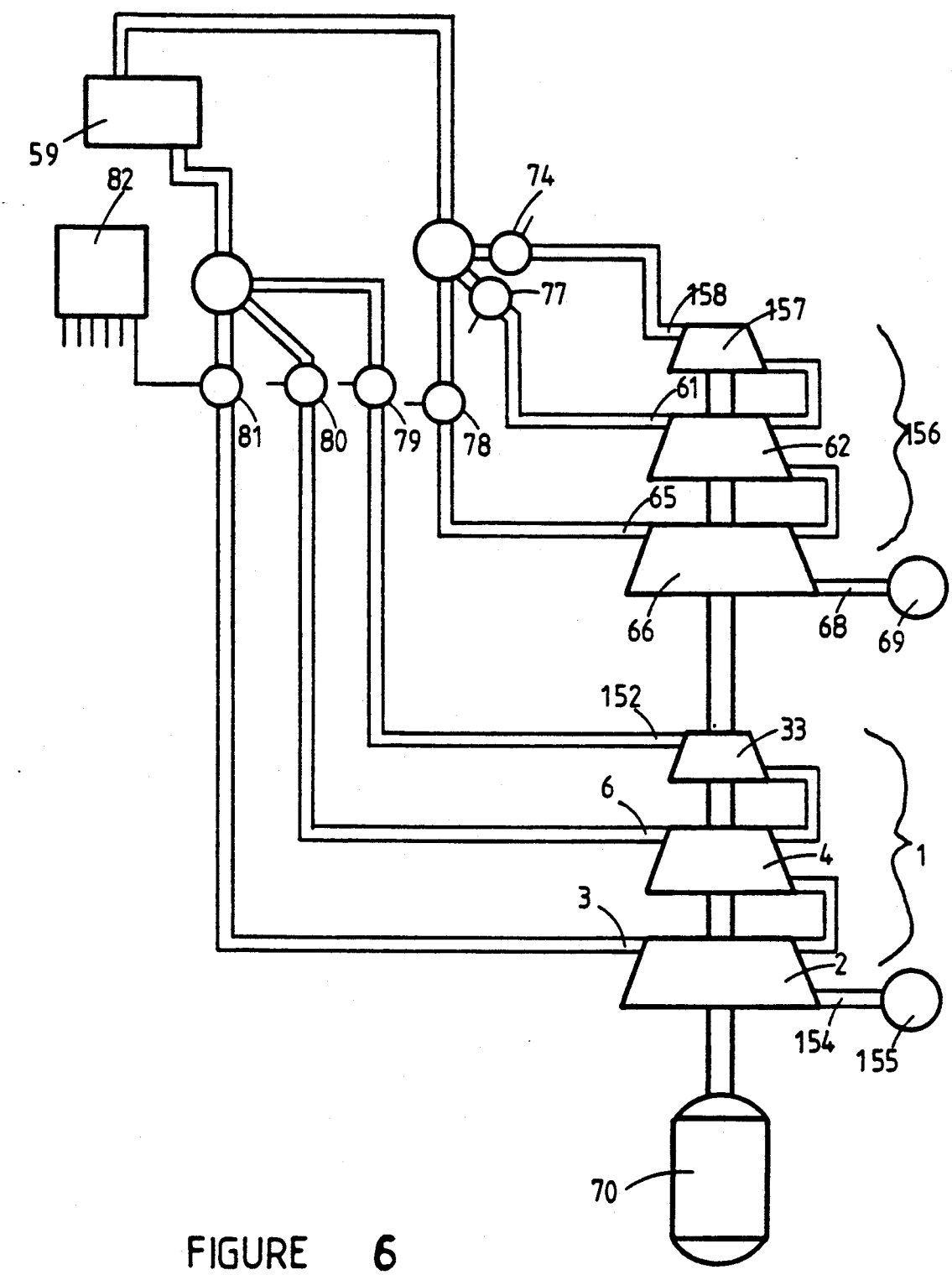

All forms of this invention are improvements to cyclic char fuel oxidation reactor plants, one example of such a plant is shown schematically in FIG. 1 and FIG. 6 and comprises:

1. A separate compressor means, 1, for compressing reactant gases into primary reactors, of three stages: a low pressure stage, 2, whose delivery end outlet, 3, connects to the input end of the intermediate pressure stage, 4, and also to primary reactor pressure vessel container, 5, containing a primary char fuel reaction chamber; an intermediate pressure stage, 4, whose delivery end outlet, 6, connects to the input end of the high pressure stage, 33, and also to the primary reactor pressure vessel container, 150, containing a primary char fuel reaction chamber; a high pressure stage, 33, whose delivery end outlet, 152, connects to the primary reactor pressure vessel container, 153, containing a char fuel primary reaction chamber. The inlet, 154, to the low pressure stage, 2, connects to a source, 155, of reactant gas containing appreciable oxygen gas, such as air.

2. A separate expander means, 156, for expanding reacted gases out of char fuel primary reaction chambers, of three stages; a high pressure stage, 157, whose inlet, 158, connects to primary reactor pressure vessel container, 59, containing a primary char fuel reaction chamber, and whose outlet, 60, connects to the inlet, 61, of the intermediate pressure stage, 62; an intermediate pressure stage, 62, whose inlet, 61, connects to a primary reactor pressure vessel container, 63, containing a char fuel primary reactor, and whose outlet, 64, connects to the inlet, 65, of the low pressure stage, 66; a low pressure stage, 66, whose inlet, 65, connects to a primary reactor pressure vessel container, 67, containing a char fuel primary reactor, and whose outlet, 68, connects to a receiver, 69, of reacted and expanded gases.

3. A drive means, 70, for driving the compressor, 1, such as an electric motor. Where the expander, 156, is a work generating engine the drive means, 70, can also be a means for absorbing the expander work output in excess of that needed to drive the compressor, 1, such as an electric generator, and in this case the expander engine, 156, drives the compressor, 1, in whole or part.

4. A number of separate pressure vessel containers, with primary reactors, 5, 150, 153, 59, 63, 67, at least equal to the sum of the number of compressor stages plus the number of expander stages.

5. The connections between stages of the compressor, 1, and between stages of the expander, 156, are fixed open gas flow connectrions which remain open whenever the plant is operating.

6. The connections, 71, 72, 73, between compressor stage outlets, 3, 6, 152, and primary reactor pressure vessel containers are changeable gas flow connections which can be opened or closed while the plant is operating and comprise means for opening and closing. The connections, 74, 75, 76, between expander stage inlets, 158, 61, 65, and primary reactor pressure vessel containers are also similar changeable gas flow connections. Only some of these changeable gas flow connections between compressor stages, expander stages, and primary reactor pressure vessel containers are shown in FIG. 1, which shows a set of such connections opened for one particular time period of a sequence of time periods.

7. Each separate primary reactor pressure vessel container has separate changeable gas flow connections to each compressor stage outlet and to each expander stage inlet and these are shown for the one particular pressure vessel container, 59, in FIG. 6 as follows:
  i. Changeable gas flow connections, 74, 77, 78, connect pressure vessel, 59, to expander stages, 157, 62, 66, respectively, when open;
  ii. Changeable gas flow connections 79, 80, 81, connect pressure vessel, 59, to compressor stages, 33, 4, 2, respectively when open;

Each of the other primary reactor pressure vessel containers, 5, 150, 153, 63, 67, has similar separate changeable gas flow connections to compressor stage outlets and to expander stage inlets and not all of these are shown in FIG. 1 and FIG. 6 in order to avoid undue complexity of the drawings.

8. A control means, 82, operates on the means for opening and closing the several changeable gas flow connections so that the primary reactor pressure vessel container, 59, is open gas flow connected, in a sequence of time periods, first to each compressor stage outlet in time order of increasing stage outlet pressure in the order of stages, 2, 4, 33, then to each expander stage inlet in time order of decreasing stage inlet pressure in the order of stages, 157, 62, 66. The primary reactor pressure vessel container, 59, is thusly open gas flow connected to but one stage during any one time period of this sequence of time periods of open gas flow connections. This sequence of time periods of open gas flow connections is repeated for pressure vessel container, 59.

9. Each of the primary reactor pressure vessel containers, 5, 150, 153, 63, 67, is similarly open gas flow connected in a sequence of time periods, first to each compressor stage outlet in time order of increasing stage outlet pressure, next to each expander stage inlet in time order of decreasing stage inlet pressure, then this sequence of time periods is repeated, by action of the control means, 82. Each compressor stage outlet is open gas flow connected to but one primary reactor pressure vessel container during any one time period of the sequence of time periods, and each expander stage inlet is open gas flow connected to but one primary reactor pressure vessel container during any one such time period. Thus the several primary reactor pressure vessel containers, 5, 150, 153, 59, 63, 67, necessarily change connections at the same time and the time periods are the same for all primary reactor pressure vessel containers.

10. Each primary reactor pressure vessel container may contain only a primary reaction chamber or may additionally contain an integral secondary reaction chamber. For example, where the pressure vessel container is filled with char fuel only a primary reactor is contained. Alternatively, where the pressure vessel container is only partially filled with char fuel the space above the char fuel can be a secondary reactor where the secondary air, stored therein during compression, reacts with producer gas emerging from the primary ractor within the char fuel during expansion. In this latter case the primary reactor pressure vessel container outlet is preferably connected into the secondary reaction chamber.

11. An example primary reactor pressure vessel container is shown in cross section in FIG. 2 wherein only a primary reactor is contained within the pressure vessel container. The primary reaction chamber, 7, contains char fuel which is added into the refuel end, 8, thereof by a refuel mechanism, 9, and this primary reactor is enclosed within the pressure vessel container, 10, and comprises: an ash collection end, 11; a char fuel direction of motion, 12, from the refuel end, 8, toward the ash collection, 11, in which direction the char fuel moves as it is being reacted and consumed within the primary reactor, 7; an ash removal mechanism, 15, which in this FIG. 1 and 2 example removes ashes from the ash collection end, 11, of the primary reactor, 7; a starting heater means, 16, for preheating the char fuel in the primary reactor, 7, up to that temperature at which it reacts rapidly with oxygen in adjacent compressed reactant gas when the cyclic char fuel reactor is being started, electrodes, 16, being used to pass a heating electric current directly through the char fuel itself in the example starting heater shown in FIG. 2.

12. The fresh char fuel refueled into the refuel end, 8, of the primary reactor, 7, is cold, and will not reat with compressed air, but is heated by conduction from those char fuel portions deeper into the primary reactor which are at a high temperature and are reacting rapidly with oxygen to create producer gas. Thus the first portion, 17, of the primary reaction chamber along the char fuel motion direction, 12, is a char fuel preheat zone, 17, and distillation of volatile matter takes place here also when char fuels containing volatile matter are being used. At the end of the preheat and volatile matter distillation zone, 17, the char fuel is at or above its rapid reaction temperature and enters the rapid reaction zone portion, 18, of the primary reaction chamber along the char fuel motion path, 12, where char fuel reacts rapidly with oxygen in adjacent compressed reactant gases to create a producer gas product, and the heat of this reaction maintains the rapid reaction zone at or above the char fuel rapid reaction temperature. Within the rapid reaction zone, 18, of the char fuel reactor, 7, the carbon of the char fuel is gasified to produce gas and leaves only the ashes which collect in the ash zone, 19, at the ash collection end, 11, of the char fuel motion path, 12.

The devices of this invention comprise additions to the separate primary reaction chamber, 7, of the cyclic char fuel oxidation reactor, as described hereinabove, an example being shown in FIG. 2.

13. A reactant gas manifold, 24, is added whose inlet, 25, connects to the several changeable gas flow connections to compressor stage outlets and expander stage inlets via the connection, 20. The outlet, 26, of the reactant gas manifold, 24, connects to several ports, 27, into the primary reaction chamber, 7. These reactant gas ports, 27, are positioned along that portion of the length of the char fuel motion path, 12, through the primary reactor, 7, which is adjacent to the char fuel preheat zone, 17.

14. A producer gas reservoir, 29, is added whose inlet, 30, connects to several ports, 31, into the primary reaction chamber, 7. These producer gas ports, 31, are distributed along that portion, 18, of the char fuel motion path, 12, adjacent to the rapid reaction zone of the char fuel.

15. The producer gas ports, 31, and also the reactant gas ports, 27, preferably have at least one area cross section dimension which is smaller than the char fuel particles being refueled into the primary reactor, 7. These ports can be of various shapes such as round holes or elongated slots.

16. The primary reactor pressure vessel container, 10, shown in FIG. 2, uses the external connection, 20, as a combined inlet and outlet to and from the primary reactor, 7.

17. When the cyclic char fuel oxidation reaction of FIG. 1, FIG. 6 and FIG. 2, is to be started, an electric current is passed through the char fuel heating electrodes, 16, to bring the char fuel up to its rapid reaction temperature. The compressor drive means, 70, then drives the compressor, 1, for starting and cycles of compression followed by expansion are commenced.

18. During compression compressed air flows from the connected compressor stage outlet, via the changeable gas flow connection into gas connection, 20 into the reactant gas manifold, 24, and thence via the reactant gas ports, 27, into the primary reaction chamber, 7. Within the rapid reaction zone, 18, air reacts rapidly with hot char fuel to form producer gas which flows via the producer gas ports, 31, into the producer gas reservoir, 29. Producer gas is thus stored during compression within the producer gas reservoir, 29, as well as within the pore spaces of the rapid reaction zone, 18.

19. During expansion producer gas flows out of the producer gas reservoir, 29, reaction zone, 18, into the reactant gas manifold, 24, via the reactant gas ports, 27, and into the connected expander stage inlet via the changeable gas flow connection into the gas flow connecting means, 20. For this FIG. 2 form of the invention the gas flow direction during expansion is thus the reverse of the flow direction during compression.

20. This cycle of compression followed by expansion is repeated. The starting heater means, 16, is turned off when the heat of the primary producer gas reaction within the primary reactor, 7, is sufficient to maintain the char fuel at its rapid reaction temperature within the rapid reaction zone, 18. The drive means for starting is turned off when the net work of the cycle is sufficient to keep the compressor running via the expander engine.

21. The total mass of primary air which is compressed into and through the primary reaction chamber is increased by the gas quantity which flows into the primary reacted gas reservoir. When at its rapid reaction temperature the char fuel will react with essentially all of the oxygen in both the air mass compressed into the pore and interstitial spaces of the hot char fuel and the air mass passing through the char fuel mass and onto the producer gas reservoir. In this way the extent of char fuel reaction, during each engine cycle of compression followed by expansion, is increased by use of the reservoirs of this invention. This is one of the beneficial objects of this invention.

22. The volume of the producer gas reservoir can be made adjustable, as by use of add on volumes or by adjustable piston in cylinder volumes. In this way the air mass reacted during each cycle can be adjusted, and the gas created and the work output are thus also adjustable.

Figure 2:
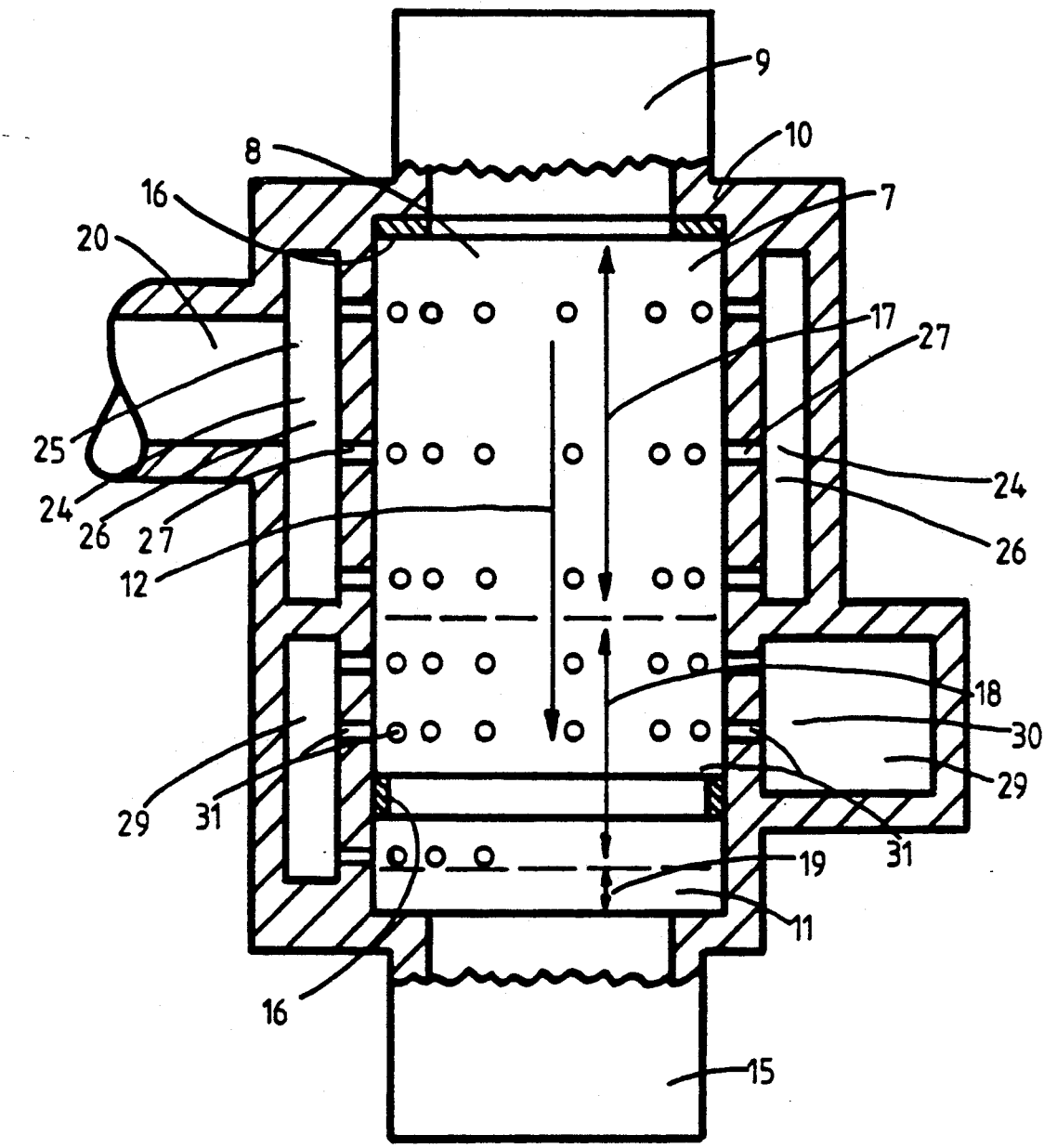

The pressure vessel container, 10, of FIG. 2, contains only a primary reactor whose product reacted gas is producer gas and, when no secondary reactor is used, the cyclic char fuel oxidation reactor plant is a char fuel gasifier wherein producer gas leaves the lowest pressure expander stage, 66, and is delivered into the reacted gas receiver pipe, 69, for use as a fuel gas elsewhere.

In some applications of cyclic char fuel oxidation reactors work output of the expander is the desired product rather than a fuel gas output, as described above. For these work output applications the producer gas product of the primary reactor is mixed with secondary air and burned to complete combustion products within a secondary reaction chamber during expansion. One particular example of a secondary reactor, integral with the primary reactor within the pressure vessel container is shown in cross section in FIG. 7 and comprises the following:

1. The primary reaction chamber, 7, occupies that portion of the pressure vessel container, 10, filled with char fuel to the char fuel level, 83.

2. The secondary reaction chamber, 84, occupies that portion of the pressure vessel container, 10, above the char fuel level, 83, and not containing any char fuel.

3. The refuel mechanism, 9, refuel end, 8, ash collection end, 11, ash removal mechanism, 15, starting heater, 16, reactant gas manifold, 24, reactant gas ports, 27, producer gas reservoir, 29, producer gas ports, 31, rapid reaction zone, 18, etc., are essentially the same as described hereinabove for the FIG. 2 example of this invention.

4. The connection, 20, into the reactant gas manifold, 24, connects only to the several changeable gas flow connections to compressor stage outlets.

5. The connection, 85, into the secondary reaction chamber, 84, connects only to the several changeable gas flow connections to expander stage inlets.

6. Thus this FIG. 7 form of the invention uses a primary reactor pressure vessel container inlet, 20, separate from the container outlet, 85.

7. During compression compressed air flows from the connected compressor stage outlet via the changeable gas flow connection from compressor outlets into gas flow inlet connection, 20, into the reactant gas manifold, 24, and thence via the reactant gas ports, 27, into the primary reaction chamber, 7. Compressed air also flows into the integral secondary reaction chamber, 84, and is stored therein during compression. Within the rapid reaction zone, 18, of the primary reactor, 7, air reacts rapidly with hot char fuel to form producer gas which flows via the producer gas ports, 31, into the producer gas reservoir, 29. Producer gas is thus stored during compression within the producer gas reservoir, 29, as well as within the pore spaces of the rapid reaction zone, 18.

8. During expansion producer gas flows out of the producer gas reservoir, 29, reaction zone, 18, into the secondary reactor, 84, where it mixes with the secondary air stored therein and burns to complete combustion products. These complete combustion products leave the secondary reactor, 84, via the outlet connection, 85, and flow into the connected expander stage inlet via the changeable gas flow connection to expander inlets.

9. In this way complete combustion of the char fuel is achieved within each cycle of compression and expansion and the work output of this cycle is thus appreciably greater than when the producer gas is not thusly burned fully. Thus complete combustion gases leave the lowest pressure expander stage, 66, and are delivered into the reacted gas receiver, 69, which is an exhaust pipe for this work output application.

In addition to the foregoing elements, as described hereinabove, additional elements and modified elements can be used for various forms of this invention.

Another form of this invention, similar to the form shown in FIG. 2, is shown in FIG. 5 wherein the inlet, 30, to the producer gas reservoir, 29, is positioned radially centrally within the ash collection zone, 19, and the rapid reaction zone, 18. The producer gas outlet ports, 31, are positioned along the length of the primary reaction chamber, 7, in the direction of char fuel motion, 12, which is adjacent to the rapid reaction zone, 18. These producer gas ports, 31, can be positioned angularly uniformly around the periphery of the inlet, 30, and are at right angles to the char fuel motion direction, 12, so that fuel particles will not tend to be pushed through these producer gas ports. With this centrally positioned inlet to the producer gas reservoir, 29, ash particles will carry over through the ports, 31, into the reservoir, 29, and the ash removal mechanism, 15, is thus positioned to remove ashes collected in the producer gas reservoir, 29. The top, 116, of the inlet, 30, to the producer gas reservoir, 29, is capped to prevent char fuel entering therein and thus bypassing the rapid reaction zone, 18.

In the form of this invention shown in FIG. 1 and FIG. 2, air enters the primary reactor, 7, during compression, at the refuel end, 8. In other applications of cyclic char burning oxidation reactors entry of air during compression may be preferred at the ash collection end, 11, of the primary reactor in order to obtain a more complete oxidation of the char fuel to ashes. Oxidation of the final portions of a char fuel tends to be obstructed by the relative increase of ash content resulting from prior char oxidation, and the final char oxidation may thus be slowed down. With char fuels of higher ash content appreciable char fuel portions may not be reacted due to this slowdown and efficiency is reduced thereby. Final char fuel oxidation can be promoted by use of the form of this invention shown in FIG. 3 and FIG. 1, wherein air enters the primary reactor, 7, at the ash collection end, 11, since maximum oxygen concentration is thus secured at the ash collection end to speed up the final oxidation of the char fuel occurring there. This FIG. 1 and FIG. 3 form of this invention is essentially similar to the FIG. 1 and FIG. 2 form of this invention as described hereinabove except as follows:

1. The reactant gas manifold, 51, inlet connects to the compressor stages and expander stages via the connection, 52. The outlet, 53, of the reactant gas manifold, 51, connects to several ports, 55, into the primary reaction chamber, 7. These reactant gas ports, 55, are positioned along that portion of the length of the char fuel motion path, 12, through the primary reactor, 7, which is adjacent to the ash collection zone, 19, and the rapid reaction zone, 18, and are positioned around most of the peripheral dimension of the primary reactor.

2. The producer gas reservoir, 56, inlet, 57, connects to several ports, 58, into the primary reaction chamber, 7. These producer gas ports, 58, are positioned along that portion of the length of the char fuel motion path, 12, through the primary reactor, 7, which is adjacent to the char fuel preheat zone, 17, and are positioned around most of the peripheral dimension of the primary reactor.

The operation of the particular example of this invention shown in FIG. 1 and FIG. 3 is essentially similar to the operation of the FIG. 1 and FIG. 2 form of this invention, as described hereinabove, except that, during compression, air enters the primary reactor, 7, at the ash collection end, 11, thereof instead of at the refuel end. As shown in FIG. 3 and FIG. 1, the gas flow direction during expansion is the reverse of that during compression. However, use of air entry at the ash collection end of the primary reactor can also utilize unidirectional flow of gases or partially unidirectional and partially reversed flow of gases by incorporating changeable gas flow connections as described herein.

Additional beneficial objects can be achieved by use of unidirectional flow, in whole or part, of the reactant gas and producer gas instead of the fully reversed flow of these gases which occurs in the FIG. 2, FIG. 3 and FIG. 5 forms of this invention as described hereinabove. One particular example of a unidirectional flow form of this invention is shown schematically in FIG. 4 and FIG. 1 and comprises:

1. The following elements are similar to those described hereinabove for the FIG. 2 form of this invention:

The separate primary reaction chamber, 7, with refuel end, 8, refuel mechanism, 9, pressure vessel container, 10, ash collection end, 11, char fuel motion direction, 12; reactant gas manifold, 24, reactant gas ports, 27; producer gas reservoir, 29, producer gas ports, 31.

2. The gas flow connection, 20, connects the reactant gas manifold, 24, only to the changeable gas flow connections from compressor stage outlets which are open during compression and are closed during expansion.

3. A separate producer gas flow connection, 21, connects the producer gas reservoir, 29, only to the changeable gas flow connections to expander stage inlets which are closed during compression and are open during expansion.

These gas flow connections thus function to create a unidirectional flow of gas from the compressor stages into the primary reactor, 7, and the producer gas reservoir, 29, via gas flow connection, 20, during compression. During expansion unidirectional flow is continued from the primary reactor, 7, and the producer gas reservoir, 29, into the expander stages, via the separate gas flow connection, 21.

With unidirectional flow of reactant air and producer gas through the primary reactor as described herein, dilution of reactant air by producer gas portions retained within connecting flow passages is avoided and the rapid reaction to producer gas commences earlier during each compression.

Where the cyclic char burning oxidation reactor is an engine the producer gas product is to be mixed with the necessary secondary air so that complete combustion of the producer gas can be obtained in the secondary reactor during expansion.

This required secondary air can be simply stored in the pressure vessel container during compression and will be available then during expansion for the burning of the producer gas. Such use of the pressure vessel container as also a secondary air reservoir, while mechanically simple, requires proper and prompt mixing of secondary air and producer gas during expansion. The required secondary air can alternatively be stored in whole or part in a reactant gas reservoir, such as are described in U.S. Pat. No. 4,794,729 and incorporated herein by reference, and the desired prompt and proper mixing of secondary air with producer gas during expansion can be more readily obtained with such separate reactant gas reservoirs.

Use of a secondary reaction chamber, separate from the pressure vessel container containing the primary reactor, may be preferred in some of those applications where work output is the desired product of the cyclic char fuel oxidation reactor plant. One particular example of such use of separate secondary reactors is shown schematically in FIG. 8 for one primary reactor pressure vessel container and for one expander stage of a cyclic char fuel oxidation reactor plant and comprises:

1. A first primary reactor pressure vessel container, 86, comprising a primary reactor, 87, fully occupying the container, 86, and comprising a producer gas reservoir, 88, and ports, a reactant gas manifold, 90, and ports, a refuel mechanism, 91, an ash removal means, 92, and these elements are essentially similar to those described hereinabove. This first primary reactor pressure vessel container comprises an inlet, 105, to the reactant gas manifold, 90, and a separate outlet, 109, from the producer gas reservoir, 88.

2. A second secondary reactor pressure vessel container, 93, comprising a secondary reaction chamber, 94, with igniter means, 95, and outlet connection, 96, integral with one expander stage inlet, an inlet connection, 97, connecting into the secondary reactor, 94, adjacent to igniter, 95.

3. A third pressure vessel container, 99, comprising a reactant gas reservoir, 100, for storing secondary air during compression, an inlet, 101, an outlet, 102.

4. The second pressure vessel container is integral with one expander stage inlet, and each expander stage inlet is thusly fitted with a separate integral secondary reactor.

5. The third pressure vessel container connects only to the first pressure vessel container containing the primary reactor, and each primary reactor of the cyclic char fuel oxidation reactor is thusly fitted with a separate reactant gas reservoir for the secondary air.

6. A first set of compressor changeable gas flow connections, 103, 104, which are the plant connections to the inlet, 105, of primary reactor pressure vessel container, 86, from each outlet of each compressor stage.

7. A second set of expander changeable gas flow connections, 106, 107, 108, which are the plant connections from the outlet, 109, of the producer gas reservoir, 88, or primary reactor pressure vessel container, 86, to each inlet of each expander stage but now connecting thereto via the inlets, 97, of the secondary reactors, 94, whose outlets, 96, connect to the expander stage inlets.

8. The third pressure vessel container inlet, 101, is open gas flow connected to the inlet, 105, of the primary reactor pressure vessel container, 86. The third pressure vessel container outlet, 102, is open gas flow connected to the outlet, 109, of the producer gas reservoir, 88.

Using these elements and gas flow connections and controls, the form of this invention shown in FIG. 8 operates as follows:

9. Both the primary reactor, 87, and the secondary air reservoir, 100, are supplied with air during the compression sequence of time intervals, and secondary air is thus stored within the reservoir, 100, during compression.

10. During the expansion sequence of time intervals the stored secondary air flows out of the reservoir, 100, mixes with the producer gas flowing out of the producer gas reservoir, 88, and the resulting fuel air mixture flows into the secondary reactor, 94, where it is ignited and burned to complete combustion products.

11. The one primary reactor pressure vessel container, 86, is thusly connected to the one separate secondary reactor, 94, during only one time period of each sequence of time periods of open gas flow connections to expander stage inlets and compressor stage outlets. During the next following time period the primary reactor pressure vessel container, 86, will be open gas flow connected to that separate secondary reactor which is integral with the inlet to the next lower pressure expander stage. Alternatively, if container, 86, has completed all open gas flow connections to expander stage inlets it will either undergo refueling and ash removal or will be open gas flow connected to the first and lowest pressure compressor stage outlet during the next following time period. Each primary reactor pressure vessel container is similarly open gas flow connected, in a sequence of time periods, to compressor stage outlets and then to expander stage inlets via their integral secondary reactors.

12. To prevent backflow of air into the producer gas reservoir, 88, via the reactant gas reservoir, 100, during compression, it may be preferred in some forms of this invention to install a unidirectional flow means, 113, in the producer gas reservoir outlet, 109, which permits gas flow via the outlet, 109, only out of the producer gas reservoir, 88. This unidirectional flow means can be a simple pressure actuated check valve or a driven valve.

13. A more detailed description of the use of reactant gas reservoirs, such as the secondary air reservoir, 100, is presented in my U.S. Pat. No. 4,865,623, *Reactant Gas Reservoirs for Cyclic Solid with Gas Reactors*, issued Sep. 12, 1989, and this material is incorporated herein by reference thereto.

14. Use of a secondary reactor separate from the primary reactor requires that the primary reactor operate always essentially filled with char fuel particles. Control of primary reactor refueling is thus greatly simplified since the refuel mechanism need only keep the primary reactor filled up and this is another beneficial object achievable by use of the FIG. 8 form of this invention.

15. Separate secondary reactors can also be used with those primary reactors utilizing a combined inlet and outlet, as shown for example in FIG. 2 and FIG. 3, wherein the gas flow during expansion is reversed from the flow during compression. In this case each secondary air reservoir can connect into the combined inlet and outlet of each primary reactor.

16. In some applications of cyclic char fuel oxidation reactor plants the several primary reactor pressure vessel containers comprise not only a primary reactor but also a steam boiler as described in my U.S. Pat. No. 4,455,837, *Cyclic Velox Boiler*, issued Jun. 26, 1984. For these applications the separate secondary reaction chamber can additionally comprise a pressure vessel liner with a steam or water flow path as a portion of the steam boiler heating surface.

17. Various types of igniter means, 95, can be used, such as electric sparks, glow plugs, burning gas air jets, etc., as is well known in the art of ignition of combustible fuel in air mixtures.

For prior art cyclic char burning engines and gasifiers ash removal mechanism, 43, means for removing ashes were used to remove ashes from the ash collection end, 11, of the primary reactor, 7, and this method can also be used for the present invention. Alternatively, or additionally, ashes can be carried over from the ash collection end, 11, into the producer gas reservoir, 29, and there separated from the gas and then removed from the producer gas reservoir. For this purpose the producer gas ports, 31, are made larger in cross section than the ash particles, a separator means, 41, for separating particles from the producer gas is placed in the producer gas reservoir, 29, and an ash removal mechanism, 42, is installed on the producer gas reservoir, 29, as shown schematically in FIG. 4. Various types of gas solid separators can be used as the separator means, 41, such as cyclone separators or other centrifugal force separators. It is simpler to remove ashes from the producer gas reservoir since whatever particles are collected there can be removed without fear of removing any reactable char fuel from the primary reaction chamber. The ash removal mechanism, 43, which removes ashes from the ash collection end, 11, of the primary reactor, 7, needs to be controlled so that only ashes and not char fuel are removed.

I claim:

1. In a cyclic char fuel oxidation reactor plant comprising:
   a separate compressor means for compressing reactant gases comprising at least one stage and each said stage comprising an outlet pipe for reactant gases being compressed therein;
   drive means for driving said compressor;
   at least one separate expander means for expanding reacted gases and each expander comprising at least one stage and each said stage comprising an inlet pipe for reacted gases to be expanded therein;
   a source of reactant gas containing appreciable oxygen gas;
   said compressor comprising an inlet to the lowest pressure stage thereof;
   a fixed open gas flow connection from said compressor inlet to said source of reactant gas;
   said expander comprising an outlet from the lowest pressure stage thereof;
   at least one receiver of expanded gas;
   a fixed open gas flow connection from said expander outlet to said receiver of reacted gas;
   means for absorbing any work output of said expander;
   a number of primary reactor pressure vessel containers at least equal to the sum of the number of compressor stages plus the number of expander stages and each said primary reactor pressure vessel container comprising:
     at least a primary char fuel reaction chamber within said primary reactor pressure vessel container;
     an inlet to said primary reactor pressure vessel container;
     a first outlet from said primary reactor pressure vessel container;
     said primary char fuel reaction chamber comprising:
       a refuel end and an ash collection end;
       a refuel mechanism means for placing char fuel into said primary reactor via the refuel end thereof;
       a direction of char fuel motion within said primary reactor from said refuel end toward said ash collection end;
       a peripheral dimension around the outer surface of said primary reactor at right angles to said char fuel motion direction;
       a char fuel preheat zone positioned toward said refuel end of said primary reactor;
       an ash collection zone positioned toward said ash collection end of said primary reactor;
       a rapid reaction zone positioned between said char fuel preheat zone and said ash collection zone;
     at least one means for removing ashes from said primary reactor; means for preheating said char fuel within said primary reactor to that temperature at which said char fuel reacts rapidly with oxygen in adjacent compressed reactant gases when said cyclic char fuel oxidation reactor plant is being started;
   means for driving said compressor means when said cyclic char fuel oxidation reactor plant is being started and when running;
   several separate changeable gas flow connections, comprising means for opening and closing, from each compressor stage outlet pipe to each primary reactor pressure vessel container inlet and from each expander stage inlet of at least one expander to each primary reactor pressure vessel container first outlet;
   control means for controlling said means for opening and closing said several separate changeable gas flow connections so that: each said primary reactor pressure vessel container is open gas flow connected, in a sequence of time periods, first to each compressor stage outlet in time order of increasing stage outlet pressure, then to each expander stage inlet in time order of decreasing stage inlet pressure; each compressor stage outlet is open gas flow connected to but one primary reactor pressure vessel container during any one time period of said sequence of time periods, and each expander stage inlet is open gas flow connected to but one primary reactor pressure vessel container during any one time period of said sequence of time periods, and each primary reactor pressure vessel container is open gas flow connected to but one stage during any one time period of said sequence of time periods; said sequence of time periods of open gas flow connections to compressor stage outlets and to expander stage inlets is repeated for each said primary reactor pressure vessel container;
   an improvement comprising adding to each said primary reactor:
   a reactant gas manifold comprising an inlet and an outlet, said outlet connecting to reactant gas inlet ports which provide a passage into said primary reaction chamber, and these ports positioned along at least that portion of the length of said primary reaction chamber in said direction of char fuel motion which is adjacent to said char fuel preheat zone;
   a producer gas reservoir comprising an inlet, said inlet connecting to producer gas outlet ports which provide a passage out of said primary reaction chamber, and these ports positioned along that portion of said length of said primary reaction chamber along said direction of char fuel motion which is adjacent to said rapid reaction zone;
   wherein all of said reactant gas inlet ports and also all of said producer gas outlet ports are smaller in at least one area cross section dimension than the char fuel particles being refueled into said primary reaction chamber;
   a fixed open gas flow connection from said primary reactor pressure vessel container inlet only to said reactant gas manifold inlet;

wherein said primary reactor pressure vessel container inlet and first outlet are combined.

2. In a cyclic char fuel oxidation reactor plant as described in claim 1, wherein:
said producer gas reservoir comprises means for separating solid and liquid particles from said producer gas;
said ash removal mechanism means for removing ashes comprising means for removing collected solid and liquid materials from at least said producer gas reservoir.

3. In a cyclic char fuel oxidation reactor plant as described in claim 1,
wherein said inlet of said producer gas reservoir is positioned approximately centrally within said ash collection zone and said rapid reaction zone;
wherein said producer gas outlet ports are positioned along the length of said primary reaction chamber, in said direction of char fuel motion, which is adjacent to said rapid reaction zone, and approximately angularly uniformly around the periphery of said producer gas reservoir inlet at right angles to said char fuel motion direction.

4. In a cyclic char fuel oxidation reactor plant as described in claim 3, wherein:
said producer gas reservoir further comprises means for separating solid and liquid particles from said producer gas;
said ash removal mechanism means for removing ashes comprises means for removing collected solid and liquid materials from at least said producer gas reservoir.

5. In a cyclic char fuel oxidation reactor plant comprising:
a separate compressor means for compressing reactant gases comprising at least one stage and each said stage comprising an outlet pipe for reactant gases being compressed therein;
drive means for driving said compressor;
at least one separate expander means for expanding reacted gases and each expander comprising at least one stage and each said stage comprising an inlet pipe for reacted gases to be expanded therein;
a source of reactant gas containing appreciable oxygen gas;
said compressor comprising an inlet to the lowest pressure stage thereof;
a fixed open gas flow connection from said compressor inlet to said source of reactant gas;
said expander comprising an outlet from the lowest pressure stage thereof;
at least one receiver of expanded reacted gas;
a fixed open gas flow connection from said expander outlet to said receiver of reacted gas;
means for absorbing any work output of said expander;
a number of primary reactor pressure vessel containers at least equal to the sum of the number of compressor stages plus the number of expander stages and each said primary reactor pressure vessel container comprising:
at least a primary char fuel reaction chamber within said primary reactor pressure vessel container;
an inlet to said primary reactor pressure vessel container;
a first outlet from said primary reactor pressure vessel container;
said primary char fuel reaction chamber comprising:
a refuel end and an ash collection end;
a refuel mechanism means for placing char fuel into said primary reactor via the refuel end thereof;
a direction of char fuel motion within said primary reactor from said refuel end toward said ash collection end;
a peripheral dimension around the outer surface of said primary reactor at right angles to said char fuel motion direction;
a char fuel preheat zone positioned toward said refuel end of said primary reactor;
an ash collection zone positioned toward said ash collection end of said primary reactor;
a rapid reaction zone positioned between said char fuel preheat zone and said ash collection zone;
at least one means for removing ashes from said primary reactor;
means for preheating said char fuel within said primary reactor to that temperature at which said char fuel reacts rapidly with oxygen in adjacent compressed reactant gases when said cyclic char fuel oxidation reactor plant is being started;
means for driving said compressor means when said cyclic char fuel oxidation reactor plant is being started and when running;
several separate changeable gas flow connections, comprising means for opening and closing, from each compressor stage outlet pipe to each primary reactor pressure vessel container inlet and from each expander stage inlet of at least one expander to each primary reactor pressure vessel container first outlet;
control means for controlling said means for opening and closing said several separate changeable gas flow connections so that: each said primary reactor pressure vessel container is open gas flow connected, in a sequence of time periods, first to each compressor stage outlet in time order of increasing stage outlet pressure, then to each expander stage inlet in time order of decreasing stage inlet pressure; each compressor stage outlet is open gas flow connected to but one primary reactor pressure vessel container during any one time period of said sequence of time periods, and each expander stage inlet is open gas flow connected to but one primary reactor pressure vessel container during any one time period of said sequence of time periods, and each primary reactor pressure vessel container is open gas flow connected to but one stage during any one time period of said sequence of time periods; said sequence of time periods of open gas flow connections to compressor stage outlets and to expander stage inlets is repeated for each said primary reactor pressure vessel container;
an improvement comprising adding to each said primary reactor:
a reactant gas manifold comprising an inlet and an outlet, said outlet connecting to reactant gas inlet ports which provide a passage into said primary reaction chamber, and these ports positioned along at least that portion of the length of said primary reaction chamber in said direction of char fuel motion which is adjacent to said char fuel preheat zone;

a producer gas reservoir comprising an inlet, said inlet connecting to producer gas outlet ports which provide a passage out of said primary reaction chamber, and these ports positioned along that portion of said length of said primary reaction chamber along said direction of char fuel motion which is adjacent to said rapid reaction zone;

wherein all of said reactant gas inlet ports and also all of said producer gas outlet ports are smaller in at least one area cross section dimension than the char fuel particles being refueled into said primary reaction chamber;

a fixed open gas flow connection from said primary reactor pressure vessel container inlet only to said reactant gas manifold inlet;

wherein said primary reactor pressure vessel container further comprises a secondary reaction chamber;

wherein said primary reactor pressure vessel container inlet and first outlet are separate and said first outlet connects only to said secondary reaction chamber.

6. In a cyclic char fuel oxidation reactor plant comprising:

a separate compressor means for compressing reactant gases comprising at least one stage and each said stage comprising an outlet pipe for reactant gases being compressed therein;

drive means for driving said compressor;

at least one separate expander means for expanding reacted gases and each expander comprising at least one stage and each said stage comprising an inlet pipe for reacted gases to be expanded therein;

a source of reactant gas containing appreciable oxygen gas;

said compressor comprising an inlet to the lowest pressure stage thereof;

a fixed open gas flow connection from said compressor inlet to said source of reactant gas;

said expander comprising an outlet from the lowest pressure stage thereof;

at least one receiver of expanded reacted gas;

a fixed open gas flow connection from said expander outlet to said receiver of reacted gas;

means for absorbing any work output of said expander;

a number of primary reactor pressure vessel containers at least equal to the sum of the number of compressor stages plus the number of expander stages and each said primary reactor pressure vessel container comprising;

at least a primary char fuel reaction chamber within said primary reactor pressure vessel container;

an inlet to said primary reactor pressure vessel container;

a first outlet from said primary reactor pressure vessel container.

said primary char fuel reaction chamber comprising:
  a refuel end and an ash collection end;
  a refuel mechanism means for placing char fuel into said primary reactor via the refuel end thereof;
  a direction of char fuel motion within said primary reactor from said refuel end toward said ash collection end;
  a peripheral dimension around the outer surface of said primary reactor at right angles to said char fuel motion direction;
  a char fuel preheat zone positioned toward said refuel end of said primary reactor;
  an ash collection zone positioned toward said ash collection end of said primary reactor;
  a rapid reaction zone positioned between said char fuel preheat zone and said ash collection zone;
  at least one means for removing ashes from said primary reactor;

means for preheating said char fuel within said primary reactor to that temperature at which said char fuel reacts rapidly with oxygen in adjacent compressed reactant gases when said cyclic char fuel oxidation reactor plant is being started;

means for driving said compressor means when said cyclic char fuel oxidation reactor plant is being started and when running;

several separate changeable gas flow connections, comprising means for opening and closing, from each compressor outlet pipe to each primary reactor pressure vessel container inlet and from each expander stage inlet of at least one expander to each primary reactor pressure vessel container first outlet;

control means for controlling said means for opening and closing said several separate changeable gas flow connections so that: each said primary reactor pressure vessel container is open gas flow connected in a sequence of time periods, first to each compressor stage outlet in time order of increasing stage outlet pressure, then to each expander stage inlet in time order of decreasing stage inlet pressure; each compressor stage outlet is open gas flow connected to but one primary reactor pressure vessel container during any one time period of said sequence of time periods, and each expander stage inlet is open gas flow connected to but one primary reactor pressure vessel container during any one time period of said sequence of time periods, and each primary reactor pressure vessel container is open gas flow connected to but one stage during any one time period of said sequence of time periods; said sequence of time periods of open gas flow connections to compressor stage outlets and to expander stage inlets is repeated for each said primary reactor pressure vessel container;

an improvement comprising adding to each primary reactor:

a reactant gas manifold comprising an inlet and an outlet; said outlet connecting to reactant gas inlet ports which provide a passage into said primary reaction chamber, and these ports positioned along at least that portion of the length of said primary reaction chamber in said direction of char fuel motion which is adjacent to said char fuel preheat zone;

a producer gas reservoir comprising an inlet, said inlet connecting to producer gas outlet ports which provide a passage out of said primary reaction chamber, and these ports positioned along that portion of said length of said primary reaction chamber along said direction of char fuel motion which is adjacent to said rapid reaction zone;

wherein all of said reactant gas inlet ports and also all of said outlet ports are smaller in at least one area cross section dimension than the char fuel particles being refueled into said primary reaction chamber;

a fixed open gas flow connection from said primary reactor pressure vessel container inlet only to said reactant gas manifold inlet;

a number of added secondary reactor pressure vessel containers, equal to the number of expander stages, and each said secondary reactor pressure vessel comprising: at least one first inlet, an outlet with a fixed open gas flow connection only to one expander stage inlet, a secondary reactor comprising an igniter means for igniting fuel gas in air mixtures, and each expander stage inlet having a fixed open gas flow connection only to the outlet of but one secondary reactor pressure vessel container, said first inlet to said secondary reactor pressure vessel container connecting to said several separate changeable gas flow connections from each said primary reactor pressure vessel container first outlet to said expander stage;

each primary reactor further comprising:

a third reactant gas reservoir pressure vessel container comprising an inlet and a separate outlet;

a fixed open gas flow connection from said inlet of said third reactant gas reservoir pressure vessel container to said inlet of said primary reactor pressure vessel container;

wherein said primary reactor pressure vessel container inlet and first outlet are separate;

wherein said producer gas reservoir comprises an outlet separate from said inlet;

a fixed open gas flow connection from said primary reactor pressure vessel container first outlet to said producer gas reservoir outlet and to said outlet of said third reactant gas reservoir pressure vessel container.

7. In a cyclic char fuel oxidation reactor plant as described in claim 6:

wherein said separate outlet of said producer gas reservoir further comprises a unidirectional flow means for permitting gas flow only out of said producer gas reservoir via said outlet.

8. In a cyclic char fuel oxidation reactor plant as described in claim 6 wherein said producer gas reservoir further comprises means for separating solid and liquid particles from said producer gas;

said ash removal mechanism means for removing ashes comprises means for removing collected solid and liquid materials from at least said producer gas reservoir.

* * * * *